(12) United States Patent
Schrader et al.

(10) Patent No.: US 8,336,946 B2
(45) Date of Patent: Dec. 25, 2012

(54) TONNEAU COVER ASSEMBLY FOR A VEHICLE

(75) Inventors: Michael A. Schrader, Plain City, OH (US); Michael Peterson, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 421 days.

(21) Appl. No.: 12/686,765

(22) Filed: Jan. 13, 2010

(65) Prior Publication Data

US 2011/0169296 A1  Jul. 14, 2011

(51) Int. Cl.
*B60P 7/04* (2006.01)
(52) U.S. Cl. ......... 296/100.15; 296/100.12; 296/100.18
(58) Field of Classification Search ............. 296/100.11, 296/100.12, 100.14, 100.15, 100.16, 100.18
See application file for complete search history.

(56) References Cited

U.S. PATENT DOCUMENTS

| | | | |
|---|---|---|---|
| 4,757,854 A | 7/1988 | Rippberger | |
| 5,076,338 A | 12/1991 | Schmeichel et al. | |
| 5,906,407 A | 5/1999 | Schmeichel | |
| 6,053,556 A | 4/2000 | Webb | |
| 6,619,719 B1 | 9/2003 | Wheatley | |
| 6,672,644 B2 | 1/2004 | Schmeichel | |
| 6,719,353 B1 * | 4/2004 | Isler et al. | 296/98 |
| 7,165,803 B2 | 1/2007 | Malmberg et al. | |
| 7,427,095 B2 | 9/2008 | Wheatley | |
| 2001/0020792 A1 * | 9/2001 | Huotari | 296/100.16 |
| 2002/0096909 A1 * | 7/2002 | Schmeichel | 296/100.15 |
| 2005/0146158 A1 * | 7/2005 | Schmeichel et al. | 296/100.16 |
| 2010/0019530 A1 * | 1/2010 | Schmeichel et al. | 296/100.15 |

* cited by examiner

*Primary Examiner* — Jason S Morrow
(74) *Attorney, Agent, or Firm* — Rankin Hill & Clark LLP

(57) ABSTRACT

A tonneau cover assembly includes a flexible cover, a rigid cross member connected with the cover, and a tensioning and/or latching mechanism connected with the cross member. The flexible cover includes a first end and a second end. The first end is disposed adjacent a cab of a vehicle to which the tonneau covers assembly is configured to attach. The second end is disposed adjacent a tailgate of the vehicle. The rigid cross member connects with the cover such that the cross member moves with the cover as the cover is rolled or folded toward the first end. The tensioning and/or latching mechanism connects with the cross member such that the tensioning and/or latching mechanism moves along with the cover as the cover is rolled or folded toward the first end.

20 Claims, 6 Drawing Sheets

TONNEAU COVER ASSEMBLY FOR A VEHICLE

BACKGROUND

This disclosure relates to a tonneau cover. Roll-up style tonneau covers are well known and many variations of these tonneau covers are available. The most popular tonneau covers include four main elements: (1) a large piece of flexible material, such as vinyl; (2) a plurality of cross-members attached to the piece of flexible material; (3) a frame that mounts to a vehicle around the load-carrying bed of the vehicle; and (4) a tensioner or release latch mechanism.

Known roll-up style tonneau covers suffer from at least two problems. First, tensioner devices in these known tonneau covers are bolted to the pickup truck and remain in place after the tonneau covers is rolled up. These tensioner devices are visually unattractive and tend to collect dirt, mulch, gravel, and many other things typically carried in the bed of a pickup truck. This can result in malfunctioning of the tensioner device and is inconvenient for the operator of the vehicle to clean. Releasing the tonneau cover can also be difficult. Known tonneau covers include release cables positioned on opposite sides of the pickup truck bed that each must be grabbed and pulled to release the cover from the vehicle body.

SUMMARY OF THE INVENTION

An example of a tonneau cover assembly that can overcome at least some of the aforementioned shortcomings includes a flexible cover, a rigid cross member connected with the cover, and a tensioning mechanism connected with the cross member. The flexible cover includes a first end and a second end longitudinally spaced from the first end. The first end is disposed adjacent a cab of an associated vehicle to which the tonneau cover assembly is configured to attach. The second end is disposed adjacent a tailgate of the associated vehicle. The rigid cross member connects with the cover such that the cross member moves with the cover as the cover is rolled or folded toward the first end. The tensioning mechanism connects with the cross member such that the tensioning mechanism moves along with the cover as the cover is rolled or folded toward the first end. The tensioning mechanism includes an adjustable rigid member configured to cooperate with a vehicle body of the associated vehicle to retain the cover against the vehicle body. The adjustable rigid member is moveable with respect to the cross member to apply tension to the cover.

Another example of a vehicle tonneau cover assembly that can overcome at least some of the aforementioned shortcomings includes a flexible cover, at least one rigid cross member connected with the cover, a left latch mechanism fixed to the at least one cross member, a right latch mechanism fixed to the at least one cross member, and a moveable handle operatively connected with each latch mechanism. The flexible cover includes a forward end and a rear end. The cover is configured to roll or fold in a longitudinal direction toward the forward end. The at least one rigid cross member connects with the cover such that the at least one cross member moves with the cover as the cover is rolled or folded. The left latch mechanism is fixed to the at least one cross member such that the left latch mechanism moves with the cover as the cover is rolled or folded. The left latch mechanism is disposed adjacent a left edge and the rear end of the cover. The right latch mechanism is fixed to the at least one cross member such that the right latch mechanism moves with the cover as the cover is rolled or folded. The right latch mechanism is disposed adjacent a right edge and the rear end of the cover. The moveable handle connects with each latch mechanism such that the moveable handle moves with the cover as the cover is rolled or folded. Movement of the handle results in operation of the latch mechanism.

Another example of a vehicle tonneau cover assembly that can overcome at least some of the aforementioned shortcomings includes a flexible cover, at least one rigid cross member connected with the cover, a moveable latch mechanism connected with and pivotable with respect to the at least one cross member, a moveable handle operatively connected with the moveable latch mechanism, and an adjustable rigid member connected with the at least one rigid cross member. The flexible cover includes a forward end and a rear end. The cover is configured to roll or fold in a longitudinal direction toward the forward end. The at least one rigid cross member connects with the cover and is elongated in a lateral direction, which is generally perpendicular to the longitudinal direction. The at least one cross member connects with the flexible cover such that the at least one cross member moves along with the cover as the cover is rolled or folded toward the first end. The moveable latch mechanism connects with the at least one cross member such that the moveable latch mechanism moves along with the cover as the cover is rolled or folded toward the first end. Movement of the handle results in movement of the latch mechanism. The moveable handle is connected with the at least one cross member such that the moveable handle moves along with the cover as the cover is rolled or folded toward the first end. The adjustable rigid member is moveable with respect to the at least one cross member in the longitudinal direction. The adjustable rigid member is connected with the at least one cross member such that the adjustable rigid member moves along with the cover as the cover is rolled or folded toward the first end.

DETAILED DESCRIPTION

Figure 1:
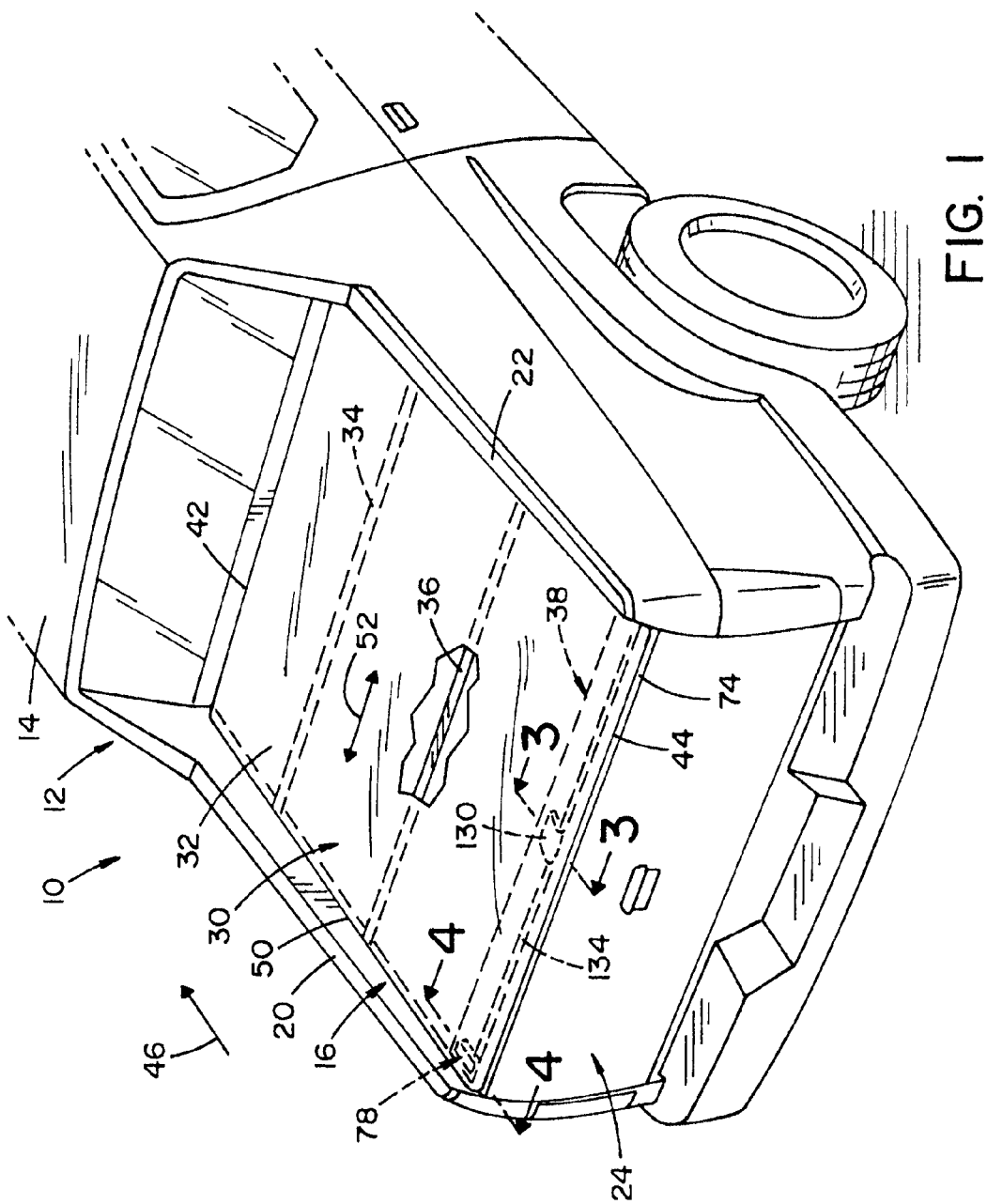
FIG. 1 is a perspective view of a rear end of a vehicle including a tonneau cover assembly in a first operating state covering a bed of the vehicle.
Figure 2:
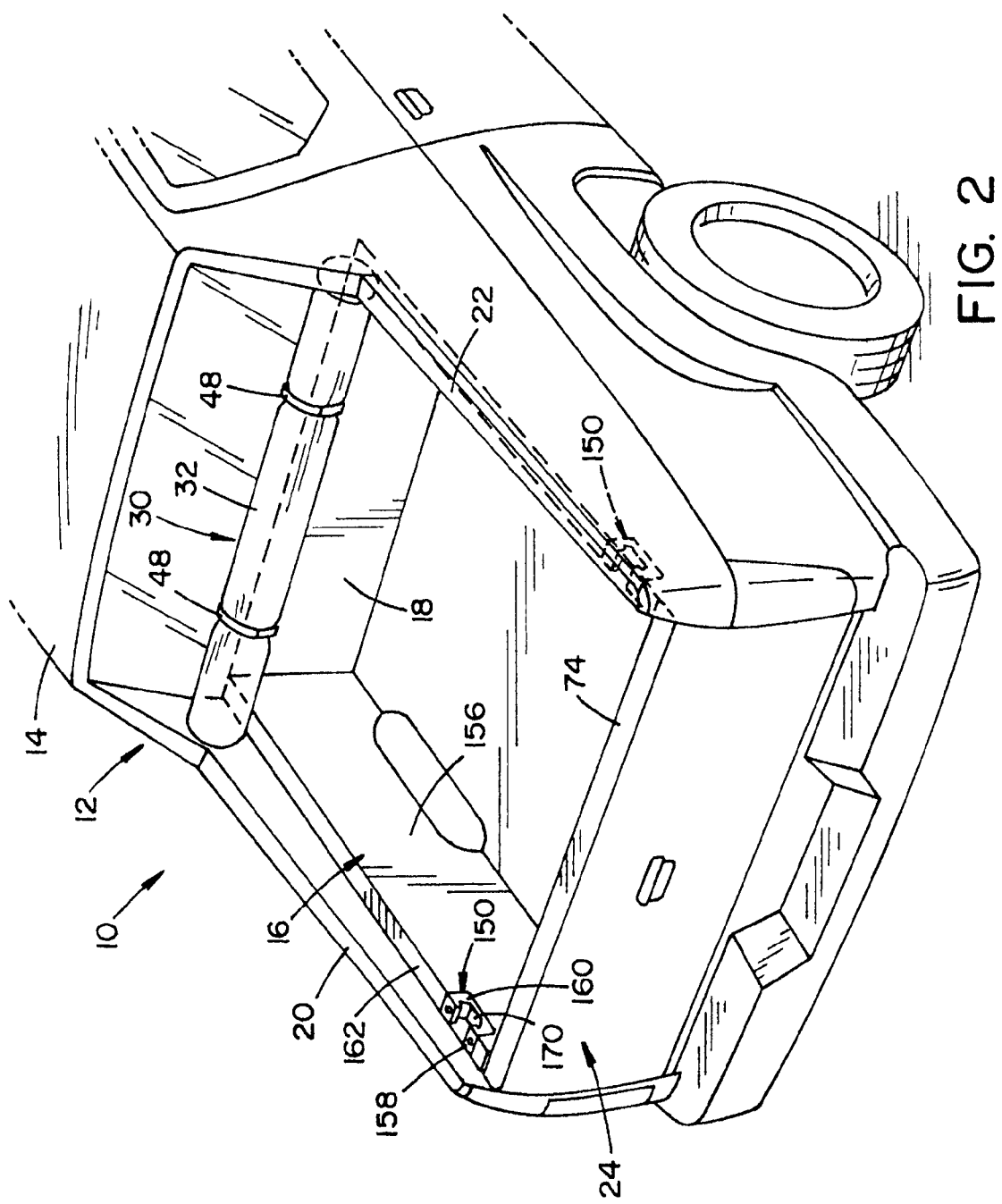
FIG. 2 is a perspective view of the rear end of the vehicle shown in FIG. 1 with the tonneau cover assembly of FIG. 1 in a second operating state providing access to the bed.

With reference to FIG. 1, a vehicle 10, which as illustrated is a pickup truck, includes a vehicle body 12 having a cab 14 and a bed 16 (more clearly visible in FIG. 2). With reference to FIG. 2, the bed 16 is defined by a rear wall 18 of the cab 14, a left wall 20, a right wall 22, and a tailgate 24. A tonneau cover assembly 30 connects with the vehicle body 12 to cover the bed 16 as shown in FIG. 1. With reference to FIG. 2, the tonneau cover assembly 30 can be rolled or folded toward the rear wall 18 of the cab 14 to provide access to the bed 16.

Figure 4:
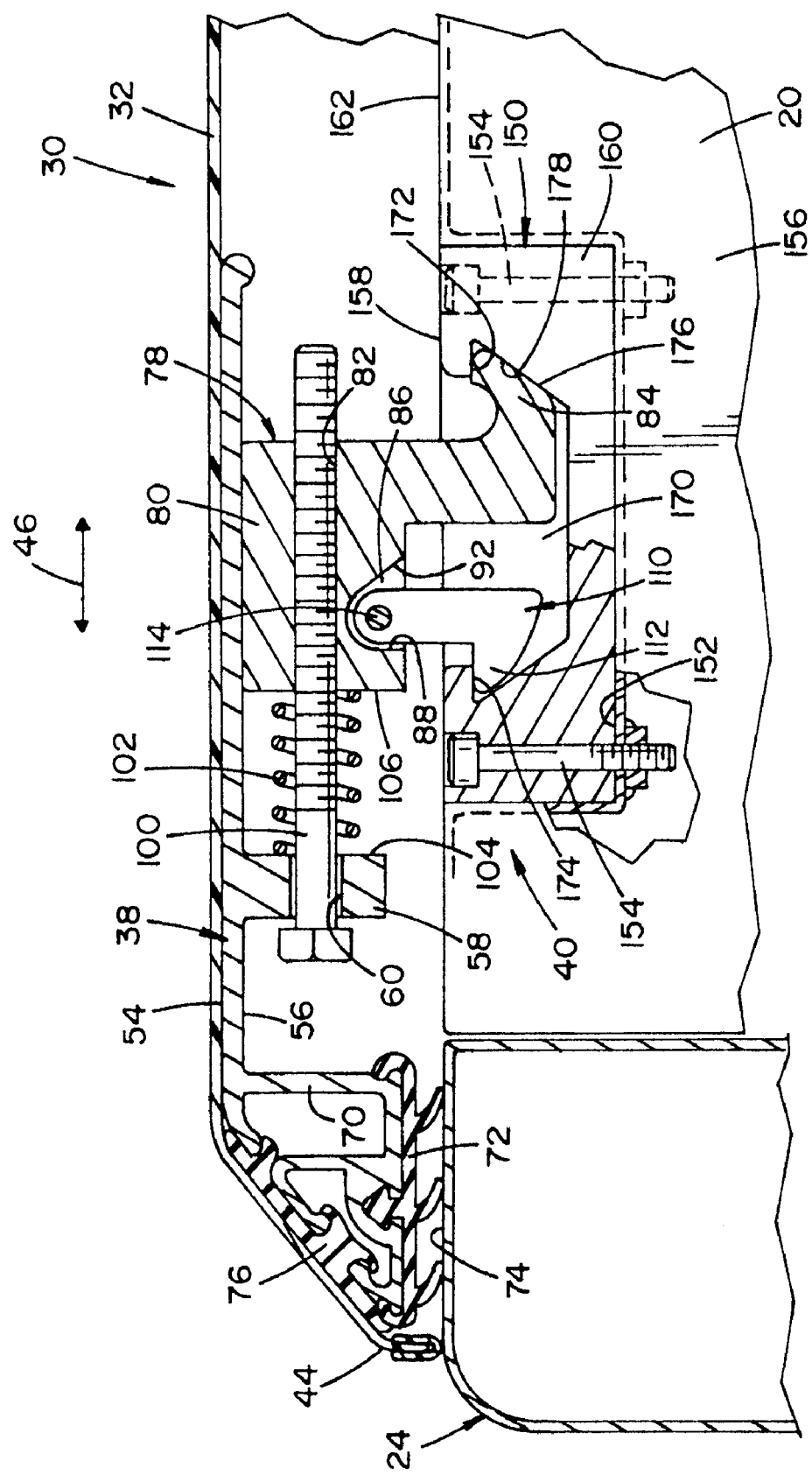
FIG. 4 is a cross-sectional view taken along line 4-4 in FIG. 1.

With reference back to FIG. 1, the tonneau cover assembly 30 includes a flexible cover 32, at least one rigid cross member (a plurality of rigid cross members 34, 36 and 38 are shown in the depicted embodiment) and a tensioning mechanism 40, which can also be referred to as a latch mechanism, which is shown in FIG. 4. With reference back to FIG. 1, the flexible cover 32 includes a forward (first) end 42 and a rear (second) end 44 longitudinally spaced from the first end. In the illustrated embodiment, the forward end 42 is disposed adjacent the cab 14 of the vehicle 10 to which the tonneau cover assembly 30 is configured to attach. The rear end 44 of the flexible cover 32 is disposed adjacent the tailgate 24 of the vehicle 10. The flexible cover 32 is configured to roll or fold in a longitudinal direction, which is parallel with arrow 46, toward the forward end 42 when being changed from the operating state shown in FIG. 1 to the operating state shown in FIG. 2. With reference to FIG. 2, straps 48 can be provided to retain the tonneau cover assembly 30 in the rolled-up state that is shown in FIG. 2. The flexible cover 32 can be made from materials similar to known tonneau covers, such as vinyl. With reference back to FIG. 1, the flexible cover 32 also includes a left lateral edge 50 on a left side of the flexible cover and right lateral edge (not visible) on a right side of the flexible cover.

The rigid cross members 34, 36 and 38 connect with the cover 32. In the illustrated embodiment, three rigid cross members are depicted; however, a fewer or greater number of cross members can be provided. The cross members 34, 36 and 38 can be made from an extruded aluminum or similar rigid material that is more rigid than the material from which the flexible cover 32 is made. In the illustrated embodiment, each cross member 34, 36 and 38 connects with the cover 32 such that each cross member moves with the cover as the cover is rolled or folded toward the first end 42. In the illustrated embodiment, each cross member 34, 36 and 38 is also elongated in a lateral direction, which is parallel with arrow 52, extending from the left edge 50 to the right edge of the flexible cover 32. The lateral direction is generally perpendicular to the longitudinal direction.

With reference to FIG. 4, the rear most cross member 38 is shown in cross section. This cross member 38 can take a different configuration than cross members that are disposed forward to this rear cross member, e.g. cross member 34 and 36. The rear most cross member 38 includes a planar upper surface 54 and the flexible cover 32 is affixed to this planar upper surface. The rear cross member 34 also includes, in the illustrated embodiment, a planar lower surface 56 and a flange 58 extends downwardly from the planar lower surface 56. In the illustrated embodiment, the flange 58 is integrally formed with the rear most cross member 38 and is fixed so that the flange 58 moves with the rear cross member 38 as the rear cross member moves. The flange 58 includes an aperture 60. The rear cross member 38 also includes a plurality of fins 70 and a rear end thereof. The fins 70 are configured to provide a connection location for a lower gasket 72 that contacts an upper surface 74 of the tailgate 24. The fins 70 also provide a connection location for an upper gasket 76 that is sandwiched between the rear cross member 38 and the flexible cover 32.

As mentioned above, the tonneau cover assembly 30 also includes the tensioning mechanism 40, which can also be referred to as a latch mechanism since this mechanism operates both to provide tension to the flexible cover 32 and to retain the flexible cover against the vehicle body 12 to cover the bed 16. For the sake of brevity throughout the remainder of the description, the tensioning mechanism, also referred to as the latch mechanism, will be referred to simply as the mechanism 40.

In the illustrated embodiment, the mechanism 40 connects with the rear cross member 38 such that the mechanism moves along with the cover 32 as the cover is rolled or folded toward the first end 42 of the cover. The mechanism 40 includes an adjustable rigid member 78 that is configured to cooperate with the vehicle body 12 to retain the flexible cover 32 against the vehicle body. The adjustable rigid member 78 is moveable with respect to the rear cross member 38 in the longitudinal direction (see arrow 46) to apply tension to the cover 32 when desired. The adjustable rigid member 78 includes a block-shaped portion 80 having an internally threaded opening 82 axially aligned with the aperture 60 formed in the flange 58. The adjustable rigid member 78 also includes a hook feature 84 that extends downwardly from the block-shaped portion 80 and cooperates with the vehicle body 12 in a manner that will be described in more detail below. The adjustable rigid member 78 also includes a lower cavity 86 formed in the block-shaped portion 80 generally defined by a vertical forward wall 88 and an angled rear wall 92.

With continued reference to FIG. 4, the mechanism 40 includes a threaded member 100, which in the depicted embodiment is a conventional bolt, and a biasing member 102, which in the depicted embodiment is a conventional compression spring. The threaded member 100 is received in the aperture 60 in the flange 58 and in the opening 82 formed in the block-shaped portion 80 of the adjustable rigid member 78. The bolt 100 threads into the opening 82 such that rotation of the bolt results in longitudinal movement, in a direction parallel to arrow 46, of the adjustable rigid member 78. The coil spring 102 receives the bolt 100 and is positioned between the flange 58 and the adjustable rigid member 78. The spring 102 acts against the flange 58 and the adjustable rigid member 78 to urge the flange 58 away from the adjustable rigid member 78. With the hook feature 84 of the adjustable rigid member 78 engaging the vehicle body 12, the biasing action of the spring 102 against the flange 58 and the adjustable rigid member 78 results in a tension force being exerted on the flexible cover 32 so that the flexible cover is pulled taut. Adjustment in the tensile force being applied to the flexible cover 32 is a function of the longitudinal distance between a forward surface 104 of the flange 58, the rearward surface 106 of the adjustable rigid member 78 and the biasing force of the spring 102. The bolt 100 also connects the adjustable rigid member 78 to the rear cross member 38 by way of the flange 58.

With continued reference to FIG. 4, the mechanism 40 also includes a moveable latch member 110 connected with and pivotable with respect to the adjustable rigid member 78. The moveable latch member 110 is configured to cooperate with the vehicle body 12 of the vehicle 10 to retain the flexible cover 32 against the vehicle body to cover the bed 16. The moveable latch member 110 is also moveable with respect to the rear cross member 38. The moveable latch member 110 includes a hook member 112 for engaging the vehicle body.

The mechanism 40 also includes a latch member axle 114 connected with the adjustable rigid member 78. The moveable latch member 110 is connected with the latch member axle 114 for rotation about a central axis of the latch member axle. The latch member axle 114 is fixed in the longitudinal direction (parallel to arrow 46) with respect to the adjustable rigid member 78. Per the orientation shown in FIG. 4, rotation of the moveable latch member 110 in the clockwise direction is limited by the forward wall 88 of the lower cavity 86 formed in the block-shaped portion 80 of the adjustable rigid member 78. Rotation of the moveable latch member 110 in the counterclockwise direction is limited by the angled rear wall 92 of the lower cavity 86 formed in the block portion 80 of the adjustable rigid member 78 and by the hook feature 84 of the adjustable rigid member 78.

Figure 6:
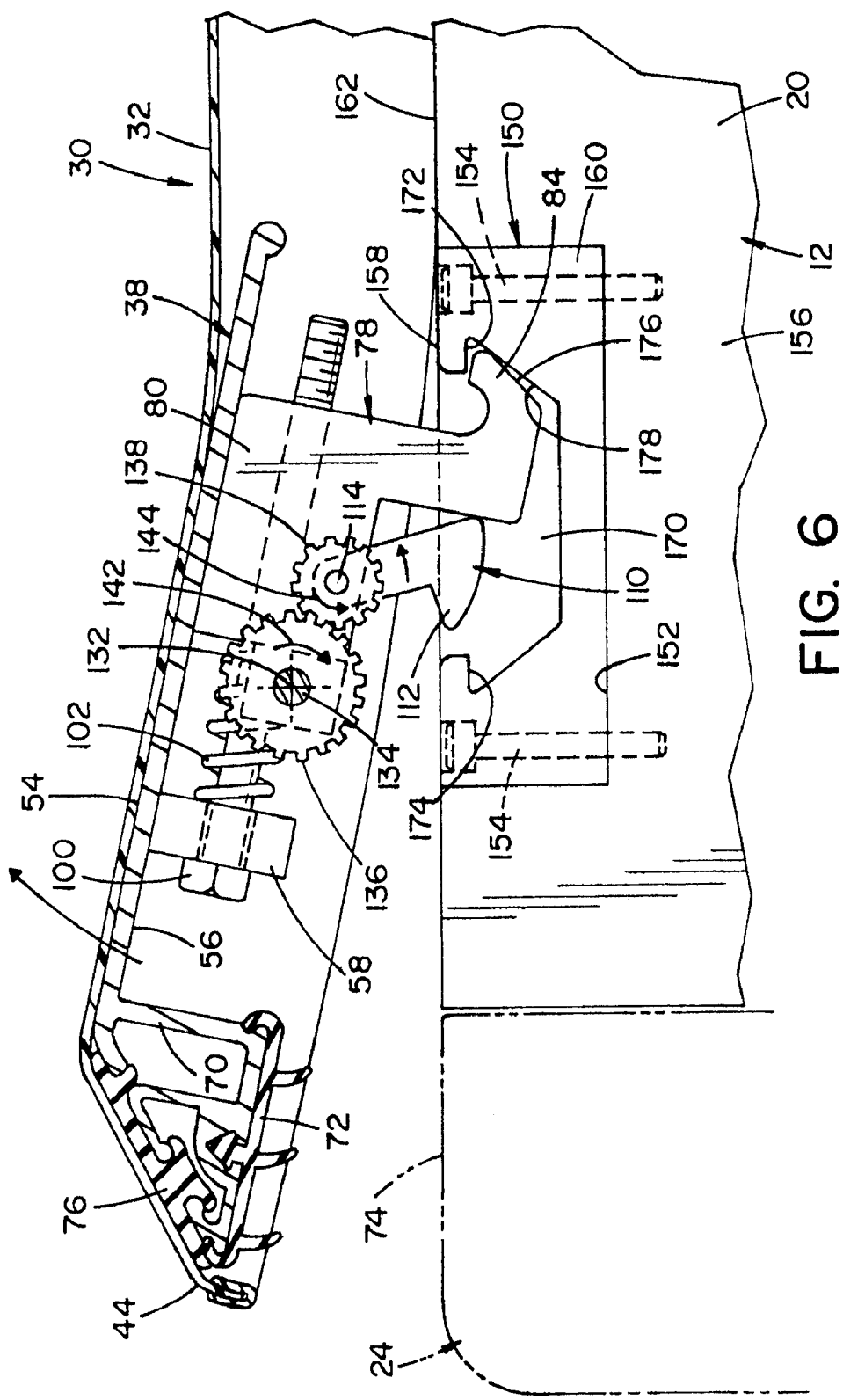
FIG. 6 is a cross-sectional view similar to FIG. 4 showing internal components of a tensioning mechanism, also referred to as a latch mechanism, of the tonneau cover assembly depicted in FIG. 1.

FIGS. 4 and 6 each depict a mechanism 40, which is located adjacent to the left edge 50 and the rear end 44 of the cover 32. A right mechanism, e.g. a right tensioning mechanism or a right latch mechanism, is also fixed to the rear cross member 38 and moves with the cover 32 as the cover is rolled or folded. The right latch mechanism includes the same components as the left latch mechanism and therefore will not be described in further detail. The right latch mechanism is disposed adjacent a right edge and the rear end 44 of the cover 32. If desired, however, the left mechanism and the right mechanism can be mounted or affixed to separate or different cross members. Moreover, such cross members may not extend entirely laterally across the flexible cover, e.g. the members to which the mechanisms attach may not extend from the left edge 50 to the right edge of the flexible cover 32.

Figure 3:
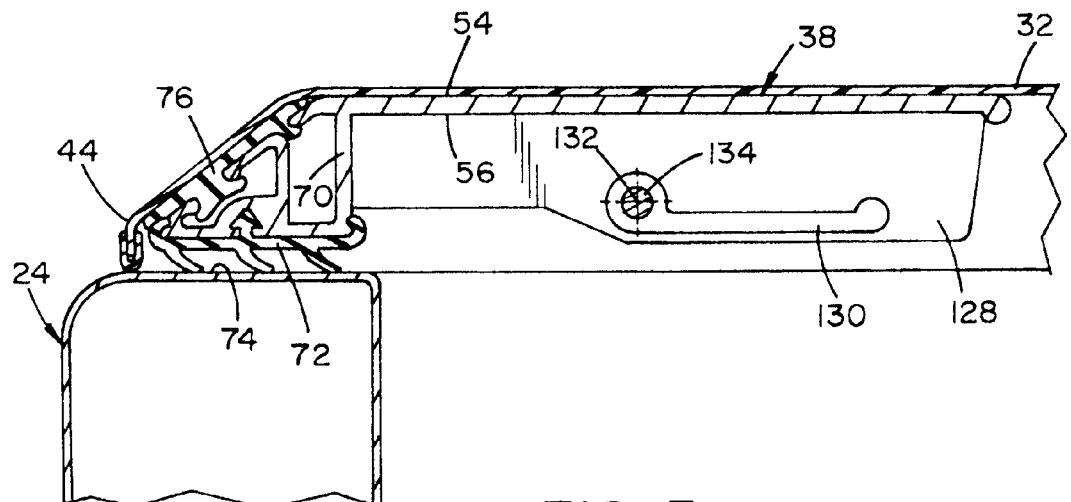
FIG. 3 is a cross-sectional view taken along line 3-3 of FIG. 1.
Figure 5:
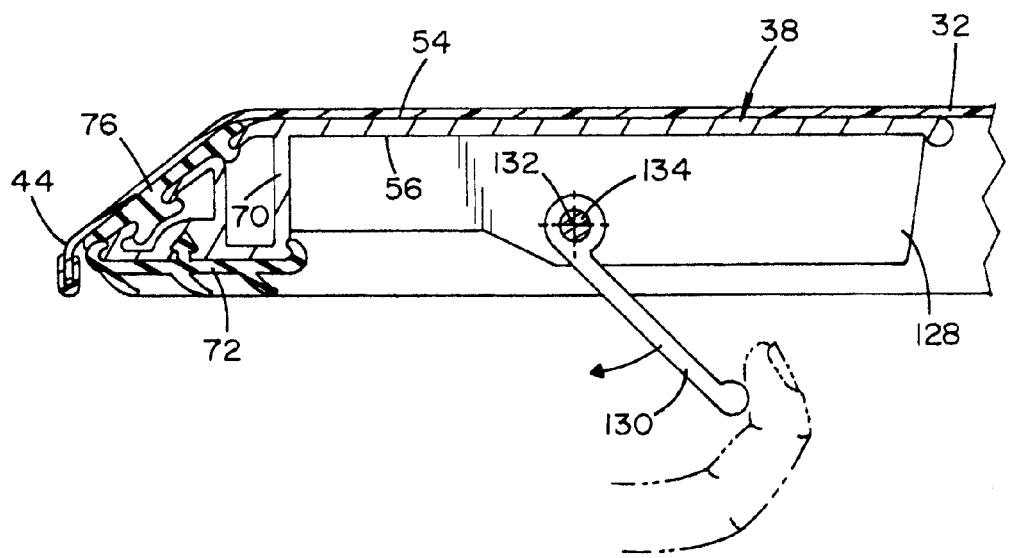
FIG. 5 is a cross-sectional view similar to FIG. 3 showing a handle of the tonneau cover assembly being actuated by an operator.
Figure 7:
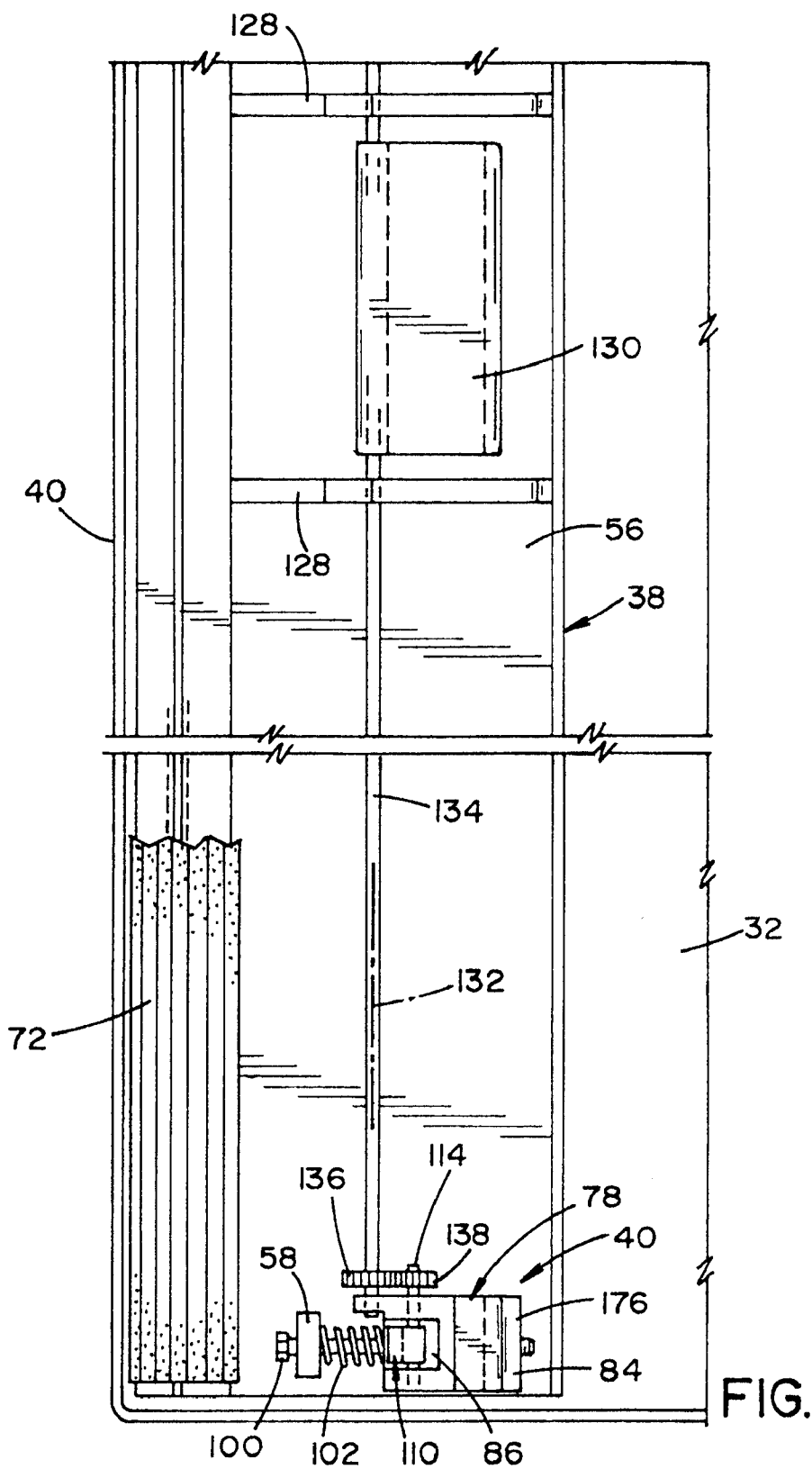
FIG. 7 is a plan view of a lower side of a portion of the tonneau cover assembly shown in FIG. 1.

With reference to FIG. 7, a bracket or flange 128 extends downwardly from the lower surface 56 of the rear cross member 38. A moveable handle 130 is operatively connected with each mechanism 40 (only one mechanism being shown in FIG. 7) such that the moveable handle 130 moves with the cover 32 as the cover is rolled or folded. Movement of the handle 130 results in operation of the mechanism 40, and more particularly results in movement of each respective latch member 110. As more clearly seen in FIG. 1, the handle 130 is disposed about midway between the left edge 50 and the right edge (not visible) of the flexible cover 32. With reference to FIG. 5, the moveable handle 130 is pivotable about an axis 132 generally parallel to the lateral direction (arrow 52 in FIG. 1). As seen in FIGS. 3 and 5, an operator grasps the handle 130 and pivots the handle about the axis 132 (in a clockwise direction per the orientation shown in FIG. 5) to disengage the moveable latch member 110 from the vehicle body 12.

With reference back to FIG. 7, a rod 134 (a plurality of rods could be provided) extends through an opening (not visible) in the flange 128 and connects the moveable handle 130 to each moveable latch member 110, e.g. the right moveable latch member of the right mechanism and the left movable latch member of the left mechanism. Movement of the rod 134 results in movement of the moveable latch member 110. In the illustrated embodiment, the rod 134 connects to a pinion 136. Rotation of the rod 134 results in rotation of the pinion 136. The pinion 136 engages a gear 138 so that rotational movement of the pinion 136 in a first direction (arrow 142 in FIG. 6) results in opposite rotational movement (arrow 144) of the gear 138. The gear 138 is connected to the latch member axle 114 such that rotational movement of the gear 138 results in rotational movement of the latch member axle 114, which results in rotational movement of the moveable latch member 110. Other conventional transmissions that allow for rotational movement of the moveable latch member 110 as a result of pivotal movement of the moveable handle 130 can also be employed. Also, the handle 130 could be designed to rotate in an opposite direction than what is shown in the figures.

As most clearly seen in FIG. 6, an engagement housing 150 is configured to connect with the vehicle body 12. In the embodiment illustrated in FIG. 6, the left wall 20 of the vehicle body 12 includes a cavity 152 that receives the engagement housing 150. Fasteners 154 connect the engagement housing 150 to the left wall 20. The engagement housing 150 can connect with the vehicle body in other conventional manners. A similar engagement housing 150 is also received in the right wall 22 (FIG. 1). The configuration and orientation of this right engagement housing is similar to the left engagement housing and therefore further description thereof is not provided.

As most clearly seen in FIG. 2, the engagement housing 150 includes an inner lateral surface 160 that is generally flush with an inner lateral surface 156 of the left wall 20. This is beneficial because the engagement housing 150 does not extend laterally into the bed 16 to minimize the likelihood of items being carried in the bed 16 from migrating into the engagement housing. A cap (not shown) can also cover the engagement housing 150 when the tonneau cover assembly 30 is in the retracted state such as that shown in FIG. 2. The engagement housing 150 also includes an upper planar surface 158 that is generally coplanar with a horizontal surface 162 of the sidewall 20, which also minimizes the likelihood of gravel, sand, dirt, mulch, and the like from entering into the engagement housing 150. Each engagement housing is disposed adjacent the tailgate 24.

With reference back to FIG. 6, the engagement housing 150 includes a cavity 170 that selectively receives the hook feature 84 of the adjustable rigid member 78 and the hook member 112 of the moveable latch member 110. The engagement housing 150 also includes an adjustable member engaging shoulder 172 for engaging the hook feature 84 of the adjustable rigid member 78. The engagement housing 150 also includes a moveable latch member engaging shoulder 174 for engaging the hook member 112 of the moveable latch member 110.

To retain the flexible cover 32 against the vehicle body 12, the hook feature 84 of the adjustable rigid member 78 cooperates with the vehicle body 12 through the engagement housing 150 and the hook member 112 of the moveable latch member 112 cooperates with the vehicle body 12 through the engagement housing 150. More particularly, the hook feature 84 of the adjustable rigid member 78 engages the adjustable rigid member engaging shoulder 172 and the hook member 112 of the moveable latch member 110 engages the moveable latch member shoulder 174 such as that shown in FIG. 4.

To release the flexible cover 32 from the rear end of each sidewall 20 and 22, the operator rotates the handle 130 (see FIG. 5) thus resulting in movement of the hook member 112 of the moveable latch member 110 away from the moveable latch member engaging shoulder 174. Accordingly, the flexible cover 32 can be rolled or folded forward toward the forward end 42 (FIG. 1). To tighten the flexible cover 32, once the hook feature 84 of the adjustable rigid member 78 is engaged in the engagement housing 150 and the hook member 112 of the movable latch member 110 is engaged in the engagement housing, the bolt 100 can be rotated pressing a chamfered engagement surface 176 of the hook feature 84 against a complementarily shaped chamfered contact surface 178 of the engagement housing 150. Since the flange 58 is fixed for movement with the rear cross member 38 and the adjustable rigid member 78 is fixed in the engagement housing 150, the rear cross member 38 can move rearwardly toward the tailgate 24 tightening the flexible cover 32.

The engagement housing 150 is depicted in the figures as being a separate component that fits into the cavity 152 formed in the side wall 20 or 22 and is bolted to the side wall. In an alternative configuration, the engagement housing 150 can be formed with and/or molded into the side wall 20 or 22. In other words, the engagement housing 150, including the cavity 170, the adjustable member engaging shoulder 172 and the moveable latch member engaging shoulder 174 can be formed with and/or molded into the side wall 20 or 22. For example, the cavity 152 that is depicted as receiving the engagement housing 150 in FIG. 4 can be shaped and configured similarly to the cavity 170 shown in FIG. 4 such that the adjustable rigid member 78 and the moveable latch member 110 directly contact the vehicle body via an engagement housing that is formed with and/or molded into the side wall.

To reduce the likelihood of items that are being stowed in the bed 16 from catching in the mechanism 40, each rigid cross member 34, 36 and 38 is connected with the flexible cover 32 such that each cross member moves along with the cover as the cover is rolled or folded toward a first end 42 of the cover. Similarly, the moveable latch member 110 is connected with the rear cross member 38 such that the moveable latch member moves along with the cover 32 as the cover is rolled or folded toward the first end 42. Likewise, the moveable handle 130 is also connected with the rear cross member 38 such that the moveable handle moves along with the cover as the cover is rolled or folded toward the first end 42 of the cover. Finally, the adjustable rigid member 78 is also connected with the rear cross member 38 such that the adjustable rigid member moves along with the cover as the cover is rolled or folded toward the first end 42 of the cover. Accordingly, the moveable components of the latch mechanism 40 are rolled up with the cover 32 when the cover is in the retracted state such as that shown in FIG. 2. This reduces the likelihood of any items that are being stowed in the bed from catching with one of the moveable components of the mechanism 40 thus resulting in the mechanism malfunctioning.

A tonneau cover assembly has been described above in detail. Modifications and alterations will occur to those upon reading and understanding the detailed description. The appended claims, however, are not limited to only the embodiments described above. Instead, the claims are to be construed broadly and to cover all equivalent structures that are recited in the claims.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A tonneau cover assembly comprising:
   a flexible cover including a first end and a second end longitudinally spaced from the first end, wherein the first end is disposed adjacent a cab of an associated vehicle to which the tonneau cover assembly is configured to attach and the second end is disposed adjacent a tailgate of the associated vehicle;
   a rigid cross member connected with the cover such that the cross member moves with the cover as the cover is rolled or folded toward the first end; and
   a tensioning mechanism connected with the cross member such that the tensioning mechanism moves along with the cover as the cover is rolled or folded toward the first end, the tensioning mechanism including an adjustable rigid member configured to cooperate with a vehicle body of the associated vehicle to retain the cover against the vehicle body, wherein the adjustable rigid member is movable with respect to the cross member to apply tension to the cover.

2. The assembly of claim 1, wherein the tensioning mechanism is disposed adjacent the second end of the cover.

3. The assembly of claim 1, further comprising a flange extending from the cross member and longitudinally spaced from the adjustable rigid member, wherein the flange is fixed in a longitudinal direction with respect to the cross member, the flange including an aperture and the adjustable rigid member including an opening axially aligned with the aperture.

4. The assembly of claim 3, wherein the tensioning mechanism includes a threaded member and a biasing member, the threaded member being received in the aperture and the opening and the biasing member acting against the flange and the adjustable rigid member to urge the flange away from the adjustable rigid member, wherein rotation of the threaded member results in movement of the adjustable rigid member with respect to the flange.

5. The assembly of claim 1, wherein the adjustable rigid member includes a hook feature.

6. The assembly of claim 5, further comprising an engagement housing configured to connect with the vehicle body, the engagement housing including a cavity and an adjustable rigid member engaging shoulder for engaging the hook feature.

7. The assembly of claim 1, further comprising a movable latch member connected with and pivotable with respect to the adjustable rigid member, the movable latch member being configured to cooperate with the vehicle body to retain the flexible cover against the associated vehicle.

8. The assembly of claim 7, further comprising a latch member axle connected with the adjustable rigid member, the movable latch member being connected with the latch member axle for rotation about a central axis of the latch member axle, the latch member axle being fixed in a longitudinal direction with respect to the adjustable rigid member.

9. The assembly of claim 7, further comprising:
   a movable handle pivotable about an axis generally parallel to a lateral direction, the handle being positioned between a first lateral edge and a second lateral edge of the flexible cover; and
   a rod connecting the movable handle to the movable latch member, wherein movement of the rod results in movement of the movable latch member.

10. A vehicle tonneau cover assembly comprising:
    a flexible cover including a forward end and a rear end, wherein the cover is configured to roll or fold in a longitudinal direction toward the forward end;
    at least one rigid cross member connected with the cover such that the cross member moves with the cover as the cover is rolled or folded;
    a left latch mechanism fixed to the at least one cross member such that the left latch mechanism moves with the cover as the cover is rolled or folded, the left latch mechanism being disposed adjacent a left edge and the rear end of the cover;
    a right latch mechanism fixed to the at least one cross member such that the right latch mechanism moves with the cover as the cover is rolled or folded, the right latch mechanism being disposed adjacent a right edge and the rear end of the cover; and
    a movable handle operatively connected with each latch mechanism such that the movable handle moves with the cover as the cover is rolled or folded, wherein movement of the handle results in operation of the latch mechanism.

11. The assembly of claim 10, wherein the handle is disposed about midway between the left edge and the right edge of the flexible cover.

12. The assembly of claim 10, wherein each latch mechanism includes a respective movable latch member that is movable with respect to the at least one cross member and is configured to cooperate with an associated vehicle body to which the cover assembly attaches to retain the cover against the vehicle body, wherein movement of the handle results in movement of each respective latch member.

13. The assembly of claim 12, further comprising at least one rod connecting the handle and each latch mechanism, wherein rotation of the handle results in rotation of the at least one rod, which results in rotation of each latch member.

14. The assembly of claim 12, wherein each latch mechanism includes an adjustable support member connected with the at least one cross member and a respective latch member, wherein each adjustable support member is movable along the longitudinal direction.

15. The assembly of claim 14, wherein each latch member pivots about an axis generally parallel to a lateral direction and generally perpendicular to the longitudinal direction.

16. The assembly of claim 14, further comprising a hook feature fixed to or integrally formed with the adjustable support member such that movement of the adjustable support member in the longitudinal direction results in movement of the hook feature in the longitudinal direction.

17. The assembly of claim 16, wherein each latch mechanism includes a biasing member urging each adjustable support member toward the forward end of the flexible cover.

18. The assembly of claim 12, further comprising a left engagement housing and a right engagement housing each configured to connect with or be formed with the vehicle body, each engagement housing including a cavity and a latch member engaging shoulder for engaging a respective latch member.

19. The assembly of claim 10, wherein the at least one cross member is rear cross member elongated in a lateral direction, which is generally perpendicular to the longitudinal direction, and the left latch mechanism and the right latch mechanism are each connected with the rear cross member.

20. A vehicle tonneau cover assembly comprising:
a flexible cover including a forward end and a rear end, wherein the cover is configured to roll or fold in a longitudinal direction toward the forward end;
at least one rigid cross member connected with the cover and elongated in a lateral direction, which is generally perpendicular to the longitudinal direction, wherein the at least one cross member is connected with the flexible cover such that the at least one cross member moves along with the cover as the cover is rolled or folded toward the first end;
a movable latch member connected with and pivotable with respect to the at least one cross member, the movable latch member connected with the at least one cross member such that the movable latch member moves along with the cover as the cover is rolled or folded toward the first end;
a movable handle operatively connected with the movable latch member, wherein movement of the handle results in movement of the latch member, the movable handle being connected with the at least one cross member such that the movable handle moves along with the cover as the cover is rolled or folded toward the first end; and
an adjustable rigid member connected with the at least one rigid cross member, the adjustable rigid member being movable with respect to the at least one cross member in the longitudinal direction, the adjustable rigid member being connected with the at least one cross member such that the adjustable rigid member moves along with the cover as the cover is rolled or folded toward the first end.

* * * * *